US012801968B2

(12) United States Patent
Kurian et al.

(10) Patent No.: US 12,801,968 B2
(45) Date of Patent: Nov. 17, 2026

(54) QUANTUM COMPUTING AND AI BIDIRECTIONAL MONITORING WITH QUANTUM COMPUTING AS A FLEXIBLE GUARDRAIL TO AI

(71) Applicant: Bank of America Corporation, Charlotte, NC (US)

(72) Inventors: Manu Kurian, Dallas, TX (US); Michael Young, Davidson, NC (US); George Albero, Charlotte, NC (US); Vinesh Patel, London (GB)

(73) Assignee: Bank of America Corporation, Charlotte, NC (US)

( * ) Notice: Subject to any disclaimer, the term of this patent is extended or adjusted under 35 U.S.C. 154(b) by 473 days.

(21) Appl. No.: 18/586,682

(22) Filed: Feb. 26, 2024

(65) Prior Publication Data

US 2025/0272591 A1 Aug. 28, 2025

(51) Int. Cl.
*G06N 10/00* (2022.01)
*G06N 10/60* (2022.01)

(52) U.S. Cl.
CPC .................................... *G06N 10/60* (2022.01)

(58) Field of Classification Search
CPC ......... G06N 10/00; G06N 10/60; G06N 20/00
See application file for complete search history.

(56) References Cited

U.S. PATENT DOCUMENTS

| | | | | |
|---|---|---|---|---|
| 2021/0097419 A1* | 4/2021 | Limberg | ................ | G06N 10/80 |
| 2022/0180237 A1* | 6/2022 | Czerwinski | ............ | B82Y 10/00 |
| 2024/0037304 A1* | 2/2024 | Akhalwaya | ......... | G06F 30/3308 |
| 2024/0354609 A1* | 10/2024 | Nikain | .................. | G06N 5/025 |
| 2025/0217393 A1* | 7/2025 | Rank | .................. | G06F 16/3329 |

* cited by examiner

*Primary Examiner* — Dave Misir
(74) *Attorney, Agent, or Firm* — Weiss & Arons LLP

(57) ABSTRACT

Systems and methods for artificial intelligence ("AI") bidirectional monitoring with a quantum-computing-powered system as a flexible guardrail to AI are provided. The systems and methods may include a quantum processor and a classical processor. The systems and methods may include requesting data elements pertaining to boundaries. The systems and methods may include controlling boundary rules and creating classical boundary rules via a classical processor. The systems and methods may include interfacing classical boundary rules with a quantum processor. The systems and methods may include running Grover's conversions in parallel over the boundary rules. The systems and methods may include pulling dynamic market data through a legacy transformation platform including dynamically derived data values and a machine learning model ("MLM") thereby monitoring and controlling an AI and machine learning ("ML") processor.

14 Claims, 8 Drawing Sheets

QUANTUM COMPUTING AND AI BIDIRECTIONAL MONITORING WITH QUANTUM COMPUTING AS A FLEXIBLE GUARDRAIL TO AI

FIELD OF TECHNOLOGY

Aspects of the disclosure relate to quantum computing. Specifically, aspects of the disclosure relate to quantum computing systems and methods for artificial intelligence ("AI") monitoring.

BACKGROUND OF THE DISCLOSURE

Currently, there are limited ways to place proper "guardrails" on AI systems. Guardrails may be considered systems for placing restrictions, monitoring, and controlling development thereof. Furthermore, AI data may be derived from generative AI (i.e., generative data). And generative data may be dynamically changing. Therefore, a system with set and defined guardrails may not be as effective as a system with flexible (e.g., malleable, permeable, conditional, etc.) guardrails in terms of monitoring AI systems.

Organizations rely heavily on AI systems for performance, executing control routines, and making strategic decisions to support clients and investors. Flexible guardrails for AI may streamline and automate these processes for organizations. And flexible guardrails for AI may reduce the need for human intervention.

It is desired, therefore, to provide flexible guardrails for AI monitoring and control. Flexible guardrails may be powered by, e.g., dynamic data elements, logic, formulae, and assumptions used to generate various types of boundaries useful for organizations.

Users may ultimately desire boundaries for AI possessing a selective set of attributes, data elements, and derivative formulae. This may be desired for specific and accurate AI data interpretation and charting decisions based on the AI boundaries.

The problem of placing flexible AI guardrails exists globally across various institutions processing AI boundaries internally. To address this problem, the disclosure provides a quantum-computing system using quantum computing for AI monitoring and control.

Classical computing is the use of bits of information to make computations. Classical computing is generally not well equipped for simultaneous and dynamic computing with multiple and parallel conversions and threads running in real-time.

Quantum computing is the use of quantum-mechanical phenomena such as superposition, spin, and entanglement to perform computations. A bit in a quantum computer is called a qubit. Quantum computing differs from classical computing in such a way that a qubit can be in a zero state and a one state at the same time.

Quantum computing is a more viable approach for controlling and monitoring dynamic AI. For example, quantum computing systems may be as fast or faster than AI systems and, therefore, may be able to more effectively monitor and control data being output by AI models without slowing down the system. Quantum computing may be leveraged in producing guardrails for AI technologies.

AI may be given blanket access to databases, including confidential databases. AI must have flexible guardrails to monitor and control AI systems. Therefore, the methods and systems provided herein enable users to monitor AI via quantum computing.

It would be desirable, therefore, to provide systems and methods for improved AI-decision making and boundary-rule control.

It would be further desirable for users to be able to utilize quantum computing to allow AI to make meaningful decisions, while giving AI boundaries.

SUMMARY OF THE DISCLOSURE

Aspects of the disclosure relate to quantum-computing-powered systems with AI processing, and associated methods, for AI monitoring and control.

Provided herein are systems and methods for applying bidirectional, quantum, flexible guardrails to AI. The systems and methods provided may integrate an application programming interface ("API") with a quantum computing platform ("QCP") to monitor an AI platform.

The systems and methods provided may include combinations of multiple elements from various data systems including distributed ledger systems (e.g., derivative formulae, Forex rates, etc.). Further, the methods and systems may provide users with backend information from a machine learning model ("MLM"). For example, weightage is a typical backend datapoint requested from an MLM. Weightage may explain decision paths taken, for instance, by AI models, to arrive at outputs.

The systems and methods provided may orchestrate the execution of multiple Grover's conversion processes dedicated to an attribute of a boundary. The Grover's conversion processes may run in parallel on multiple data systems. Grover's conversion processes convert classical computing methods to quantum computing methods. Grover's conversion processes may work via a Grover diffusion operator. A Grover diffusion operator is a fundamental building block in Grover's algorithm, enabling efficient quantum search. Grover's conversion processes make quantum computing more efficient. Grover's conversion processes make the ability to find proper AI boundaries more efficient.

The systems and methods provided may fetch weightages for various data elements and attributes, including but not limited to, logics formulae, decision paths, and MLM elements and attributes. The systems and methods thereby use a legacy transformation platform to transform qubits into data for precise interpretation of target state values for various elements and attributes.

The quantum-computing-powered systems may be operated by a quantum processor. The quantum processor may include a default number of quantum threads. A quantum thread may include a default number of quantum circuits.

Systems and methods for flexible AI monitoring and control using a quantum-computing-powered system are provided. The systems and methods may utilize quantum computing including a quantum processor.

Systems and methods may include receiving AI boundaries expressed in terms of computer code. Systems and methods may also include requesting data elements pertaining to AI boundaries.

Systems and methods may include quantum computing. Quantum computing may be leveraged as a guardrail, expressed in terms of computer code, for AI technologies. Quantum computing may be as fast or faster than AI and therefore may be able to monitor data being output by AI models without slowing down the system.

Systems and methods may include guardrails for AI systems. The guardrails may be flexible/soft guardrails.

Implementing a system in which the standards/guardrails are soft and malleable may allow dynamic and relevant monitoring of AI.

Systems and methods may include AI boundary rules. AI boundary rules may include boundaries. For example, the system may define X, Y, and Z boundaries, where X represents a soft boundary, Y represents another soft boundary, and Z represents a hard boundary. The flexible guardrails of the quantum computing may allow stretching of the X and Y boundaries. However, the quantum computing may not allow AI to cross the Z boundary. Creating a combination of hard and soft boundaries may enable flexible yet effective monitoring of AI.

Systems and methods may allow for monitoring AI without interfering with the machine learning and the data generation of the AI model. Systems and methods may impose AI boundaries that may give the AI freedom to explore, while ensuring that the AI remains within certain soft and hard-set boundaries.

Systems and methods may include using quantum computing as a monitor over AI and concurrently leveraging AI to dynamically update the quantum computing.

Systems and methods may include using quantum computing as a leveled-guardrail system. A leveled-guardrail system may be considered an AI boundary system that provides soft and hard boundaries for an AI such that the AI and user have leveled (i.e., equal) control. Further, the system may be considered "leveled" because the system may include an override mechanism for a user to override AI control.

Systems and methods may include using quantum computing to define danger points—i.e., AI malfunction, lack of user oversight, and lack of AI oversight—and highlight data that is associated with the danger points.

Systems and methods may include using quantum computing to create a mixture of hard and soft/flexible boundaries to effectively monitor AI.

Systems and methods may include dynamically derived data values and an MLM. Systems and methods may also include processing logic and an AI and machine learning ("ML") processor.

Systems and methods may pass dynamically derived data values through an MLM. Systems and methods may fetch weightage given to data elements in an MLM. Systems and methods may also route weightage for data elements back through a QCP, an API controller, a request management module, and an authentication controller. Systems and methods may enable a user to receive requested data elements, e.g., weightages, decision paths, and other attributes derived from AI/ML engines.

Systems and methods may include one or more other sources of data including, for example, current market data. Current market data may be analyzed, for example, via dynamic derivative formulae.

Systems and methods may also include data elements including, for example, derivative formulae, market pricing change, weightage given for data elements in an ML model, and weightage given for decision paths for explainability. Explainability may be considered the ability to explain AI decisions using mathematics, probability, and quantifiable terms.

Systems and methods may also include confidential database controlling and data retrieval using a quantum-computing-powered system with multi-thread computing. Systems and methods may include a classical processor and a quantum processor.

Systems and methods may also include receiving computer code representing one or more boundaries. Systems and methods may include requesting from a central server, via an API, one or more data elements pertaining to the one or more boundaries. Systems and methods may include controlling, via a boundary controller, the one or more requested data elements. Systems and methods may include controlling, via a boundary controller, the one or more requested data elements by enabling user override on the one or more boundaries.

Systems and methods may include controlling, via a boundary controller, the one or more requested data elements to enforce a boundary rule. The boundary rule may, for example, ensure each term of the one or more requested data elements corresponds to a definition in the World Book Encyclopedia. Systems and methods may also include controlling, via a boundary controller, the one or more requested data elements by any other suitable means.

Systems and methods may also include requesting, via a boundary management module, a synthesis of one or more boundary rules, using the classical processor. The synthesis may be in response to the requesting one or more data elements.

Systems and methods may also include interfacing, via an API controller, the one or more boundary rules with the quantum processor. The quantum processor may be located within a QCP.

Systems and methods may also include converting, via the quantum processor, the one or more boundary rules into one or more quantum conversions. Systems and methods may also include converting, via the quantum processor, the one or more boundary rules from a classical algorithm to a quantum algorithm. The systems and methods may use one or more Grover's diffusion operators in parallel.

Systems and methods may also include fetching a quantum conversion for an n-th data element. The n-th data element may be a number ("n") corresponding to a given data element requested.

Systems and methods may also include fetching one or more dynamically derived data values from one or more other data sources via a legacy transformation platform. The legacy transformation platform may include dynamically derived data values and an MLM. The MLM may include processing logic and an AI/ML processor.

Systems and methods may also include passing the fetched dynamically derived data values through the MLM. Further, systems and methods may include fetching weightage given to the dynamically derived data values passed through the MLM.

Systems and methods may also include routing the fetched weightage for the dynamically derived data values back through the QCP, the API controller, the boundary management module, and the boundary controller. Systems and methods may also include receiving the fetched weightage for the dynamically derived data values.

Systems and methods may also include storing the fetched weightage in a database. Systems and methods may also include using the fetched weightage to make a decision-making system. The decision-making system may be based on the receiving the computer code representing one or more boundaries.

Systems and methods may also include logging, in a cloud-based control file stored in the database, the fetched weightage. Systems and methods may also include using the cloud-based control file as part of making decisions based on the receiving the one or more boundaries.

Systems and methods may also include determining whether the fetched weightage is authentic. Systems and methods may include only routing the fetched weightage to a user when it is determined that the fetched weightage is authentic.

Systems and methods may also include quantum processor conversion of one or more boundary rules. The quantum processor converts a bit-based control algorithm to a qubit-based control algorithm.

Systems and methods may also include an AI and ML processor that determines a fetched weightage at least in part using dynamic market data and historical market frequency patterns.

Systems and methods may also include one or more other sources of data including current market data. The current market data may be analyzed via dynamic derivative formulae.

Systems and methods may also include a quantum processor. A quantum processor may include a default number of quantum threads, a quantum thread including a default number of quantum circuits.

Systems and methods may fetch weightage given to the dynamically derived data values passed through the MLM. Systems and methods may fetch weightage including, but not limited to, dynamically derived data values.

Systems and methods may also include fetched dynamically derived data values. Dynamically derived data values may be extracted via derivative formulae, market pricing change, weightage given to one or more data elements in an MLM, and weightage given for decision paths for explainability.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
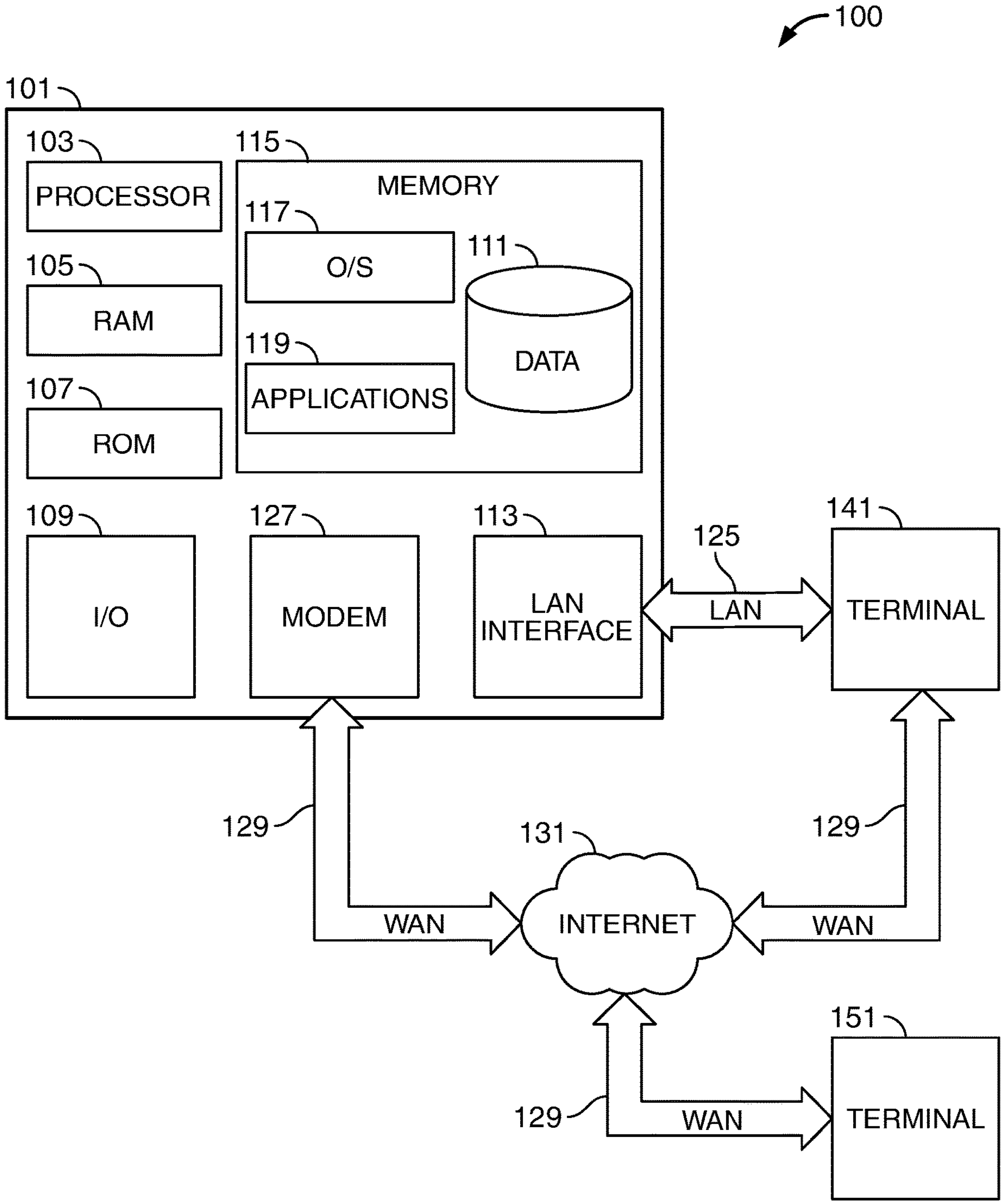
FIG. 1 shows an illustrative system in accordance with principles of the disclosure.

Systems and methods are provided for quantum-computing-powered systems and methods with AI processing for AI guardrails. The systems and methods may use quantum computing. Quantum computing may include a quantum processor. Systems and methods may also include a classical (i.e., non-quantum) processor. A quantum processor refers to a computing device whose operations can harness aspects of quantum mechanics, such as superposition, interference, and/or entanglement.

Quantum processors are associated with vastly improved speed and efficiency over classical computers. For example, whereas classical computers represent data in bits, which can be either 0 or 1, quantum processors use qubits which utilize superposition (i.e., the ability to be in multiple states at the same time until it measured) to allow for a state of 0, 1, or any probability of being 0 or 1. The probabilities can be manipulated using matrix-based quantum gates, which are analogous to classical logic gates. Qubits are therefore able to represent many more data possibilities than a bit-based system of the same size. This allows for greater speed and less memory usage than classical systems.

The quantum processor may include a default number of quantum threads. A quantum thread may include a default number of quantum circuits. Quantum circuits, in turn, refer to hardware and software based computational models that include quantum gates and are used for executing quantum computations. For example, in some embodiments, at least one of the quantum circuits may include a Toffoli gate. A feature of the Toffoli gate is its universal nature—meaning it can represent both classical and quantum operations. In certain embodiments, at least one of the quantum circuits may include a Hadamard gate. A feature of a Hadamard gate is its ability to represent a superposition state.

Controlling the development and deployment of AI is a complex and nuanced challenge. One of the key aspects of this challenge is establishing boundaries to ensure AI operates within safe and ethical guidelines. These boundaries can be broadly categorized into two types: hard and soft.

Hard boundaries may be strict rules that completely prohibit certain actions, development, or interactions for AI systems. A hard boundary may be considered a red stop sign for an AI—crossing a hard boundary would be forbidden under any circumstances.

The following are other examples of hard boundaries for AI. An example of a hard boundary may be prohibiting AI access to specific data sets. A hard boundary may protect sensitive data like medical records or personal information, where unauthorized AI access may have serious consequences.

Another example of a hard boundary may be banning certain AI functionalities. For example, an AI system might be restricted from using facial recognition technology or autonomous weapons.

Another example of a hard boundary may be limiting AI decision-making autonomy. In high-stakes situations, like healthcare or finance, human oversight and intervention might be mandatory for critical decisions made by AI.

Hard boundaries may offer clear and unambiguous limitations, making them easier to enforce and understand. But they may also be inflexible and hinder the development of potentially beneficent AI applications.

Soft boundaries, on the other hand, may be more flexible and allow for some degree of AI interaction within defined parameters. A soft boundary may be considered a yellow caution sign, urging careful consideration before proceeding.

The following are examples of soft boundaries for AI. An example of a soft boundary may be time-bound data access for AI systems. For example, an AI might be granted access to specific data sets for a limited period, followed by strict data deletion protocols.

Another example of a soft boundary may include access level restrictions. For example, different levels of access may be granted based on an AI's purpose and capabilities. For example, an AI used for customer service might have lower access privileges compared to one involved in financial analysis.

Another example of a soft boundary may be functionality limitations. For example, certain features or functionalities within an AI system might be restricted or disabled to mitigate potential risks such as risks associated with customer-facing applications and other similar risks.

Soft boundaries may offer greater flexibility and may enable the development of more sophisticated AI applications. However, soft boundaries may require careful design and implementation to ensure they mitigate risks and prevent misuse.

Ultimately, the choice between hard and soft boundaries depends on the specific context and the potential risks involved. A combination of both approaches may be beneficial to achieve a balance between safety, ethics, and innovative development in the field of AI.

Some additional considerations may be included. For example, transparency of AI development and explainability of AI development may be important features to include. Regardless of the type of boundaries implemented, it is crucial to ensure transparency in how AI systems operate and why certain decisions are made. This may help build trust and enable human intervention when necessary or beneficial.

Additionally, continuous monitoring and evaluation are important. As AI systems evolve, it is essential to continuously monitor their behavior and assess the effectiveness of the implemented boundaries. This may enable implementation of adjustments and adaptations as needed.

By considering the different types of boundaries and the associated challenges, this disclosure moves toward a future where AI benefits humanity in a safe, ethical, and responsible manner.

Systems and methods for quantum-computing-powered systems and methods with AI processing for AI guardrails are provided herein.

Provided herein are systems and methods for a quantum-computing-based AI processing control for AI guardrails. A quantum system is a system that uses both classical and quantum techniques. The systems and methods provided may integrate an API with a QCP to transmit and respond to requests from users. The users may be without access to personal or business data.

The systems and methods may provide orchestration of execution of multiple Grover's conversion processes and threads running in parallel on multiple data systems.

A Grover's conversion may utilize a Grover's diffusion algorithm. Grover's diffusion algorithms may identify a data element by amplitude amplification. Grover's diffusion algorithm may enable efficient monitoring and control of AI systems.

Systems and methods are provided for a quantum-computing-based, real-time, boundary control based on a specific set of attributes. The specific set of attributes may be extracted using a quantum conversion technique from various data systems including structured and unstructured data systems and dynamically changing derivative formulae. The targets may be extracted without the need for any direct access to data systems for users.

Systems and methods are also provided for the retrieval of ML weightage parameters, elements, and formulae, providing explanations for AI decision paths, and interpreting results without providing AI access to confidential data.

Systems and methods are provided for integration of API with a quantum channel to facilitate the transmission of requests and responses to and from authorized agents and parties using AI systems.

Systems and methods are provided for instantaneous responses and reference data leads for efficient AI interpretation processing, thereby saving time, and avoiding lapses in protecting data from AI dangers.

Systems and methods provided may include requests for one or more data elements. These data elements may include, but are not limited to, derivative formulae, market pricing change, weightage given for a data element in an MLM, and weightage given for AI decision paths for explainability.

Explainability is the ability for a system to be explainable. A system may be explainable with respect to its aspects and relative to others in particular contexts. A system is explainable if an explainer can provide information (e.g., an explanation) to a user, enabling the user to understand an aspect of the system within a given context.

The systems and methods provided herein are bidirectional. Bidirectionality means that, at any given step in the systems and methods provided, the next step chosen may be a prior or future step.

A method is provided herein for AI monitoring and control using a quantum-computing-powered system. The system may include a quantum processor.

The method may include receiving one or more boundaries, the one or more boundaries placing one or more restrictions on an AI and ML processor.

A quantum-computing-powered system is provided herein for AI computing and for AI monitoring and control. The system may include a quantum processor.

A user of the quantum-computing-powered system may receive one or more boundaries. The one or more boundaries may place one or more restrictions on an AI and ML processor.

The method may include requesting, via a API, one or more data elements pertaining to the one or more boundaries. The method may include controlling, via a boundary controller, the requesting of the one or more data elements by enabling user override on the one or more boundaries.

The method may include, in response to the requesting one or more data elements, managing, via a boundary management module, the production of one or more hard boundary rules based on the one or more data elements. The one or more hard boundary rules may disable the AI and ML processor.

The method may include interfacing, via an API controller, the one or more hard boundary rules with the quantum processor. The quantum processor may be located within a QCP.

The method may include processing, via the quantum processor, the one or more hard boundary rules. The processing may use one or more Grover's diffusion operators in parallel with one another.

The method may include fetching a quantum boundary for an n-th data element. "n" may be a number corresponding to the one or more data elements.

The method may include fetching one or more dynamically derived data values from one or more other data sources via a legacy transformation platform. The legacy transformation platform may include dynamically derived data values and an MLM. The MLM may include a processing boundary logic, and the AI and ML processor.

The method may include producing one or more soft boundary rules via the processing boundary logic. The one or more soft boundary rules may enable the AI and ML processor with the one or more restrictions.

The method may include passing the fetched dynamically derived data values through the MLM applying the one or more soft boundary rules. The method may include fetching weightage given to the dynamically derived data values passed through the MLM.

The method may include routing the fetched weightage for each of the dynamically derived data values back through the QCP, the API controller, the boundary management module, and the boundary controller applying the one or more hard boundaries. The method may include receiving the fetched weightage for each of the dynamically derived data values.

The method may include storing the fetched weightage in a database. The method may include using the fetched weightage to make decisions based on both the receiving the one or more boundaries and danger points associated with the AI and ML processor. The danger points may identify instances where the AI and ML processor attempted to bypass the one or more hard and soft boundaries.

The method may include logging, in a cloud-based control file, the fetched weightage stored in the database. The method may include using the cloud-based control file as part of making decisions based on the receiving the one or more boundaries.

The method may include determining whether the fetched weightage is authentic. The method may include only routing the fetched weightage to a user when it is determined that the fetched weightage is authentic. Authentic weightage may bypass the one or more restrictions.

The method may include processing, via the quantum processor, the one or more hard and soft boundary rules with the quantum processor via a qubit-based algorithm. The method may include the AI and ML processor determines the fetched weightage at least in part using dynamic market data and historical market frequency patterns. The one or more other data sources may include current market data analyzed via dynamic derivative formulae.

The method may include, if the AI and ML processor attempts to bypass the one or more hard boundaries, the AI and ML processor may be automatically disabled. The method may include, if the AI and ML processor attempts to bypass the one or more soft boundaries, the user may be prompted to authenticate by password. If the user does not authenticate by password, the AI and ML processor may be automatically disabled.

The method may include using a quantum processor. The quantum processor may include one or more quantum threads. Each quantum thread may include one or more quantum circuits.

The method may include using one or more restrictions based on dynamically derived data values comprising derivative formulae, market pricing change, weightage given for the one or more data elements in the MLM, and weightage given for decision paths for explainability.

A quantum-computing-powered system with AI computing for AI monitoring and control is provided herein. The quantum-computing-powered system may include a quantum processor.

The system may include a user of the quantum-computing-powered system. A user of the system may receive one or more boundaries. The one or more boundaries may place one or more restrictions on an AI and ML processor.

The user of the system may request one or more data elements pertaining to the one or more boundaries. The user of the system may control, via a boundary controller, the requesting one or more data elements by enabling user override on the one or more boundaries.

The user of the system may manage, via a boundary management module, a production of one or more hard boundary rules, in response to the request of one or more data elements. The system may be configured to interface, via an API controller, the one or more hard boundary rules with the quantum processor. The quantum processor may be located within a QCP.

The system may be configured to process, via the quantum processor, the one or more hard boundary rules. The processing may use one or more Grover's diffusion operators in parallel with one another.

The system may be configured to fetch a quantum result for an n-th data element. "n" may be a number corresponding to the one or more data elements.

The system may be configured to fetch one or more dynamically derived data values from one or more other data sources via a legacy transformation platform. The legacy transformation platform may include dynamically derived data values and an MLM. The MLM may include a processing boundary logic, and the AI and ML processor.

The system may be configured to produce one or more soft boundary rules via the processing boundary logic. The one or more soft boundary rules may enable the AI and ML processor with the one or more restrictions.

The system may be configured to pass the fetched dynamically derived data values through the MLM applying the one or more soft boundary rules. The system may be configured to fetch weightage given to the dynamically derived data values passed through the MLM.

The system may be configured to route the fetched weightage for each of the dynamically derived data values back through the QCP, the API controller, the boundary management module, and the boundary controller applying the one or more hard boundary rules. The system may be configured to receive the fetched weightage for each of the dynamically derived data values.

The system may be configured to store the fetched weightage in a database. The system may be configured to use the fetched weightage to make decisions based on both the receiving the one or more boundaries and danger points associated with the AI and ML processor. The danger points may identify instances where the AI and ML processor attempted to bypass the one or more hard and soft boundaries.

The system may be configured to log, in a cloud-based control file, the fetched weightage stored in the database. The system may be configured to use the cloud-based control file as part of making decisions based on the receiving the one or more boundaries.

The system may be configured to determine whether the fetched weightage is authentic. The system may be configured to only route the fetched weightage to a user when it is determined that the fetched weightage is authentic. An authentic weightage may bypass the one or more restrictions.

The system may be configured such that the processing, via the quantum processor, of the one or more hard boundary rules includes processing via a qubit-based algorithm. The system may be configured such that the AI and ML processor determines the fetched weightage at least in part using dynamic market data and historical market frequency patterns. The one or more other data sources may include current market data analyzed via dynamic derivative formulae.

The system may be configured such that if the AI and ML processor attempts to bypass the one or more hard boundaries, the AI and ML processor may be automatically disabled. The system may be configured such that if the AI and ML processor attempts to bypass the one or more soft boundaries, the user may be prompted to authenticate by password. If the user does not authenticate by password, the AI and ML processor may be automatically disabled.

The system may be configured such that the quantum processor may include one or more quantum threads. Each quantum may include one or more quantum circuits. The system may be configured such that the dynamically derived data values include derivative formulae, market pricing change, weightage given for the one or more data elements in an MLM, and/or weightage given for decision paths for explainability.

Systems and methods described herein are illustrative. Systems and methods in accordance with this disclosure will now be described in connection with the figures, which form a part hereof. The figures show illustrative features of system and method steps in accordance with the principles of this disclosure. It is understood that other embodiments may be utilized, and that structural, functional, and procedural modifications may be made without departing from the scope and spirit of the present disclosure.

FIG. 1 shows an illustrative block diagram of system 100 that includes computer 101. Computer 101 may alternatively be referred to herein as a "server" or a "computing device." Computer 101 may be a workstation, desktop, laptop, tablet, smart phone, or any other suitable computing device. Elements of system 100, including computer 101, may be used to implement various aspects of the systems and methods disclosed herein.

Computer 101 may have a processor 103 for controlling the operation of the device and its associated components, and may include RAM 105, ROM 107, input/output module 109, and a memory 115. The processor 103 may also execute all software running on the computer—e.g., the operating system and/or voice recognition software. Other components commonly used for computers, such as EEPROM or Flash memory or any other suitable components, may also be part of the computer 101.

Memory 115 may be comprised of any suitable permanent storage technology—e.g., a hard drive. The memory 115 may store software including the operating system 117 and application(s) 119 along with any data 111 needed for the operation of the system 100. Memory 115 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). Computer 101 may execute the instructions embodied by the software to perform various functions.

Input/output ("I/O") module may include connectivity to a microphone, keyboard, touch screen, mouse, and/or stylus through which a user of computer 101 may provide input. The input may include input relating to cursor movement. The input may relate to database backup, search, and recovery. The input/output module may also include one or more speakers for providing audio output and a video display device for providing textual, audio, audiovisual, and/or graphical output. The input and output may be related to computer application functionality. The input and output may be related to database backup, search, and recovery.

System 100 may be connected to other systems via a local area network ("LAN") interface 113.

System 100 may operate in a networked environment supporting connections to one or more remote computers, such as terminals 141 and 151. Terminals 141 and 151 may be personal computers or servers that include many or all the elements described above relative to system 100. The network connections depicted in FIG. 1 include a LAN 125 and a wide area network ("WAN") 129 but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated if the network connections shown are illustrative and other means of establishing a communications link between computers may be used. The existence of various well-known protocols such as TCP/IP, Ethernet, FTP, HTTP, and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking user functionality related to communication, such as e-mail, Short Message Service (SMS), and voice input and speech recognition applications. Application program(s) 119 (which may be alternatively referred to herein as "plugins," "applications," or "apps") may include computer executable instructions for invoking user functionality related performing various tasks. The various tasks may be related to database backup, search, and recovery.

Computer 101 and/or terminals 141 and 151 may also be devices including various other components, such as a battery, speaker, and/or antennas (not shown).

Terminal 151 and/or terminal 141 may be portable devices such as a laptop, cell phone, Blackberry™, tablet, smartphone, or any other suitable device for receiving, storing, transmitting and/or displaying relevant information. Terminals 151 and/or terminal 141 may be other devices. These devices may be identical to system 100 or different. The differences may be related to hardware components and/or software components.

Any information described above in connection with database 111, and any other suitable information, may be stored in memory 115. One or more of applications 119 may include one or more algorithms that may be used to implement features of the disclosure, and/or any other suitable tasks.

The disclosure may be operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by a computer. Generally, program modules include routines, programs, objects, components, data structures, etc., that perform tasks or implement abstract data types. The disclosure may also be practiced in distributed computing environments where tasks are performed by remote processing devices that are linked through a communications network. In a distributed computing environment, program modules may be in both local and remote computer storage media including memory storage devices.

Figure 2:
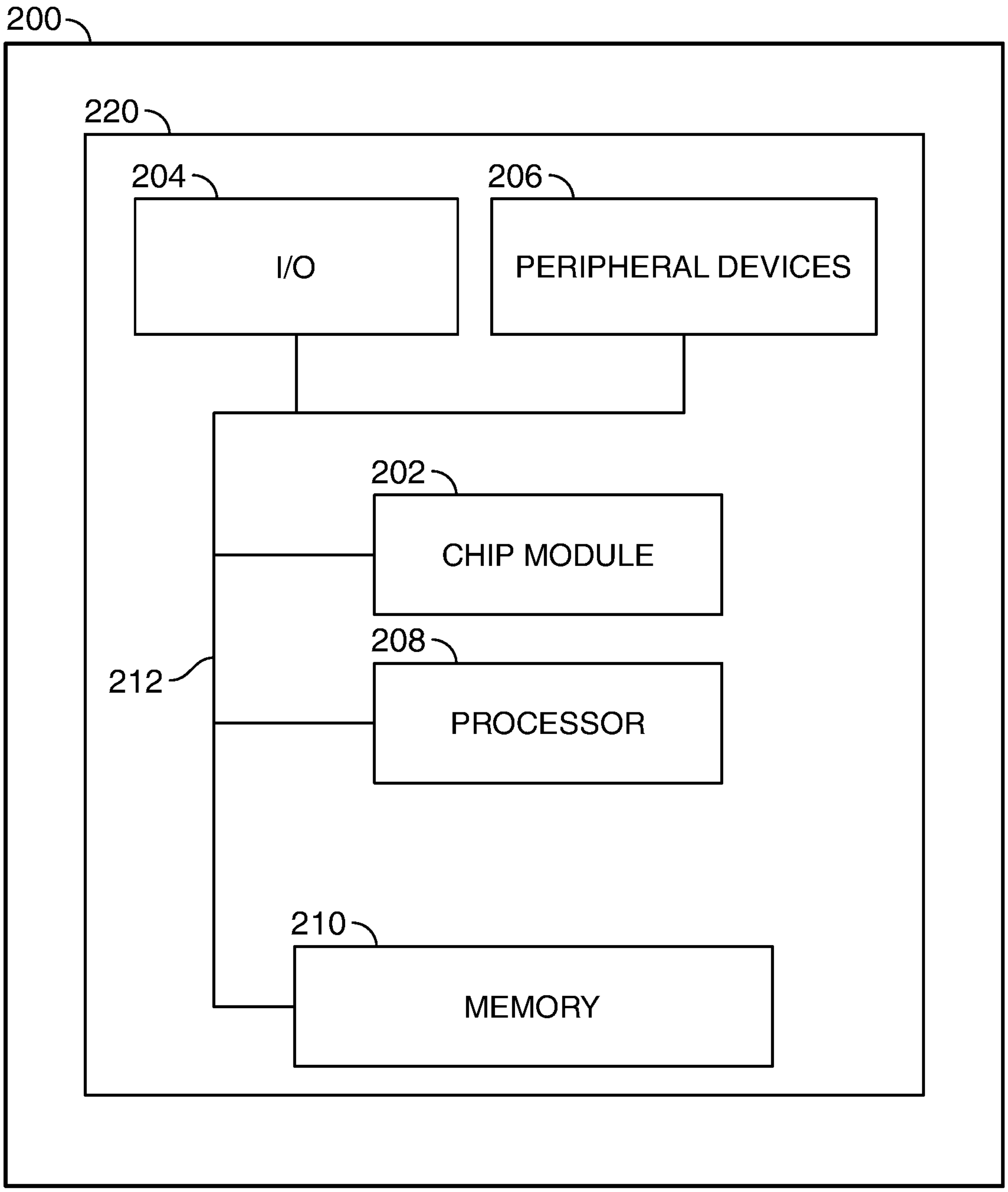
FIG. 2 shows another illustrative apparatus in accordance with principles of the disclosure.

FIG. 2 shows illustrative apparatus 200 that may be configured in accordance with the principles of the disclosure. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions (which may be alternatively referred to herein as "computer instructions" or "computer code"), applications, signals, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
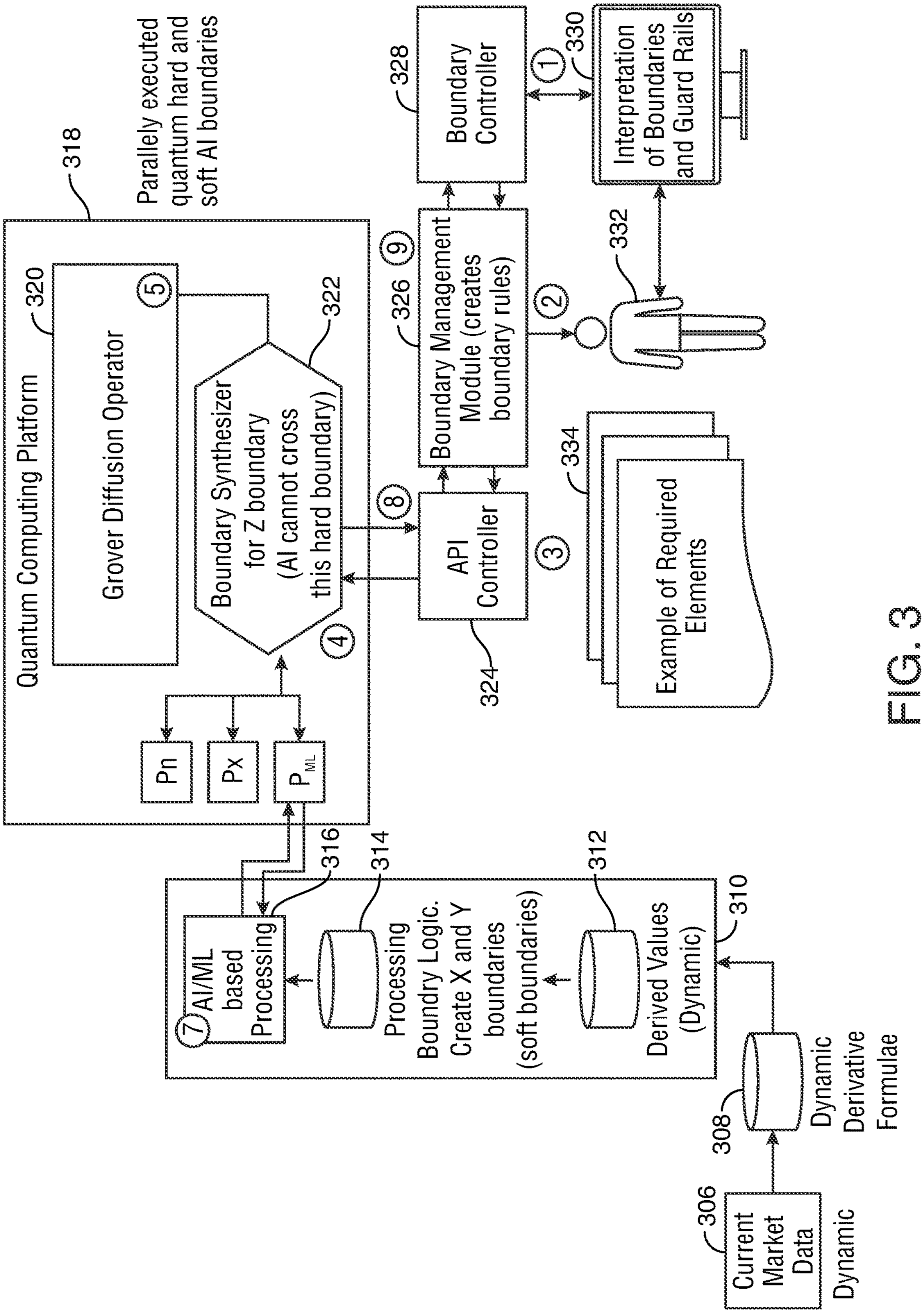
FIG. 3 shows yet another illustrative diagram in accordance with principles of the disclosure.

FIG. 3 shows an illustrative flowchart of the methods and systems in accordance with principles of the disclosure. FIG. 3 shows architecture and process steps of a quantum-computing-powered system with multi-thread computing for AI monitoring and control. FIG. 3 may be broken down into three detailed segments represented by FIGS. 4-6 below.

The methods and systems may begin with user 332. A user 332 may receive one or more boundaries and guard rails 330 and may determine one or more required data elements 334 based on the receiving one or more boundaries. The user 332 may request, via an API, one or more data elements pertaining to the one or more boundaries. The methods and systems may include the following:

The user 332 may control (1), via a boundary controller 328, the requesting one or more data elements.

The user 332 may send (2), via the boundary controller 328, the one or more requested data elements to boundary management module 326. The boundary management module 326 may create one or more boundary rules based on the one or more requested data elements. Further, the user 332 may request, via the boundary management module 326, a synthesis of one or more boundary rules, via a classical processor, in response to the requesting one or more data elements.

The user 332 may interface (3), via an API controller 324, the one or more boundary rules with a quantum processor. The quantum processor may be located within a QCP 318. The QCP 318 may also be referred to as a parallelly executed quantum hard and soft AI boundaries.

The user 332 may synthesize (4) the one or more boundary rules with a boundary synthesizer for Z boundary 322. The boundary synthesizer for Z boundary 322 may synthesize one or more boundary rules into a format usable by a Grover diffusion operator.

The boundary synthesizer for Z boundary 322 may create, e.g., a Z boundary. The Z boundary may be a hard boundary. A hard boundary may disable an entity (e.g., an AI) from crossing the hard boundary. The hard boundary may be a hard-wired boundary to prevent passage of a predetermined signal or group of signals. A soft boundary may enable an entity to cross the soft boundary but with certain restrictions (e.g., access level, time allowed, and functionality).

The user 332 may convert (5), via a quantum processor, the one or more boundary rules into one or more quantum boundary rules. The user 332 may convert the one or more boundary rules into one or more quantum boundary rules by using one or more Grover's diffusion operators 320 in parallel. The one or more quantum boundary rules may be represented as Pn, Px, and $P_{ML}$. Pn may represent an n-th quantum boundary rule, where n may be an integer. An n-th data element value may be returned to Pn. Px may represent an x-th quantum boundary rule, where x may be an integer. Px may receive information about the x-th quantum boundary rule but may not provide information for computing. $P_{ML}$ may represent an ML and AI quantum boundary rule. The ML and AI boundary rule may receive and provide information for ML and AI computing.

User 332, or a system, may fetch (6) a quantum boundary rule for an n-th data element. The n-th data element may be a data element corresponding to the number "n."

The user 332 may fetch (7) one or more dynamically derived data values 312 from one or more other data sources via a legacy transformation platform 310. The legacy transformation platform 310 may include dynamically derived data values 312 and an MLM. The MLM may include a processing boundary logic 314 and an AI/ML processor 316. The processing boundary logic 314 may create, e.g., X and Y boundaries (soft boundaries). Soft boundaries may allow a user to access, interact, and manipulate data with restrictions. Restrictions may include access level, time allowed to access data, and software functionality.

Information may be passed from a static data source to the legacy transformation platform 310 via the AI/ML processor 316. Further, dynamic current market data 306 may be fed through dynamic derivative formulae 308 into the legacy transformation platform 310 via the dynamically derived data values 312. Ultimately, the fetched dynamically derived data values 312 may be passed through the MLM. Further, weightage may be fetched from the dynamically derived data values passed through the MLM.

The user 332 may route (8) the fetched weightage for each of the dynamically derived data values 312 (with the soft X and Y boundaries) back through the QCP 318 (with the hard Z boundary), the API controller 324, the boundary management module 326, and the boundary controller 328.

The user 332 may receive (9) the weightage for each of the dynamically derived data values 312.

Figure 4:
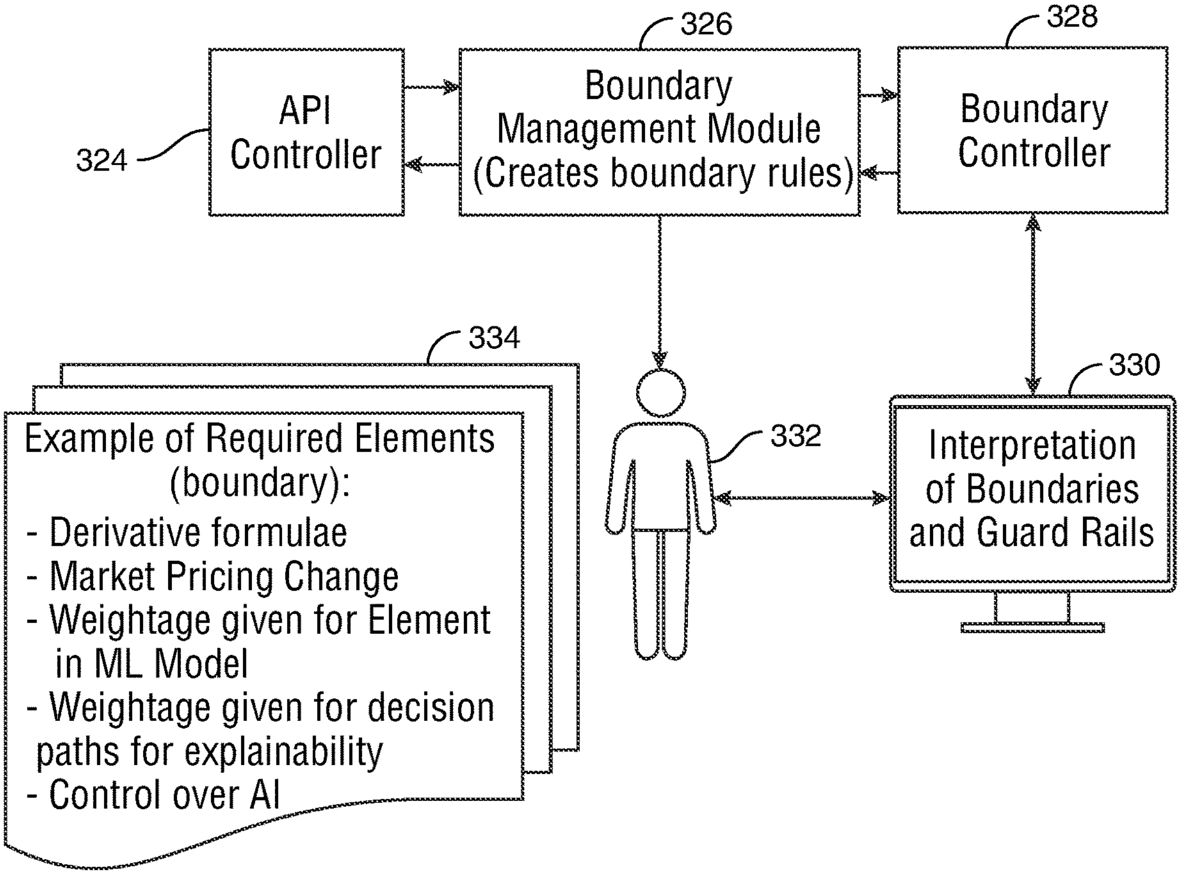
FIG. 4 shows an additional illustrative diagram in accordance with principles of the disclosure.

FIG. 4 shows an illustrative diagram in accordance with principles of the disclosure. The illustrative diagram includes user receiving boundaries and guard rails 330, boundary controller 328, boundary management module 326, and API controller 324.

A user 332 may receive boundaries and guard rails 330 and make a request for one or more data elements 334 pertaining to the boundaries and guard rails 330. Data elements 334 may include, but are not limited to, derivative formulae, market pricing changes, weightage given for data elements in an MLM, and weightage given for decision paths for explainability.

FIG. 4 shows that the user requests may be routed to a boundary controller 328. The boundary controller 328 may control the user requests for one or more data elements pertaining to boundaries.

FIG. 4 shows that the user requests may then be routed to a boundary management module 326. Boundary management module 326 may utilize a classical processor to create a boundary rule for each requested data element. The created boundary rules may then be sent to API controller 324. The API controller 324 may enable the classical boundary rules to interface with a quantum computing engine. The API controller 324 accomplishes this by converting the classical boundary rules into a quantum format (e.g., qubits, quantum threads, and quantum boundary rules).

Figure 5:
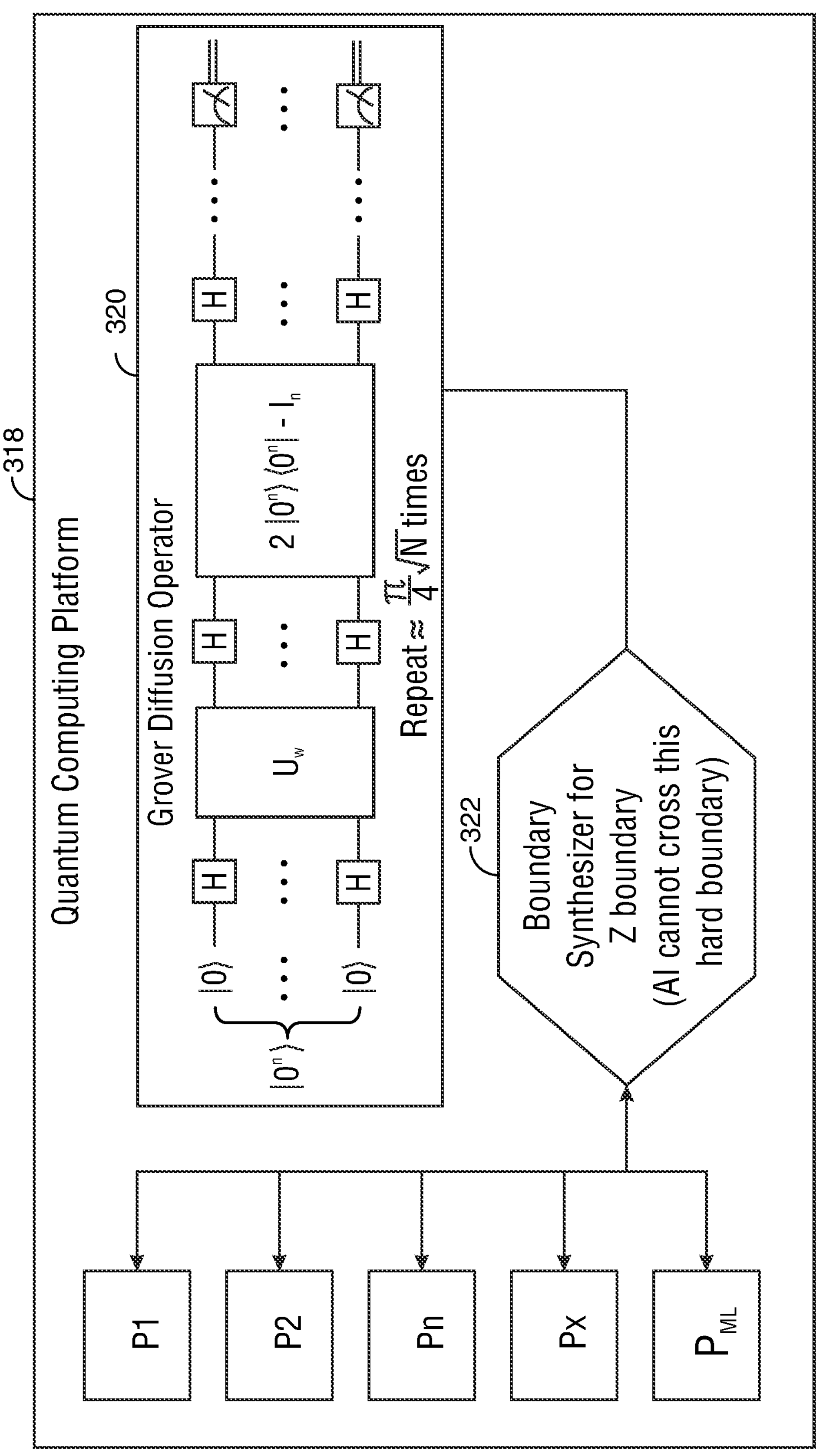
FIG. 5 shows still another illustrative diagram in accordance with principles of the disclosure.

FIG. 5 shows an illustrative diagram of an exemplary QCP 318, which may also be referred to as a parallelly executed quantum hard and soft AI boundaries, in accordance with principles of the disclosure.

FIG. 5 shows a boundary synthesizer 322 for Z boundary (e.g., a hard boundary such that an AI cannot cross this hard boundary) within QCP 318. The API controller 324 from FIG. 4 may flow directly into the boundary synthesizer 322. The boundary synthesizer 322 may take the quantum boundary rules and synthesize them in a way for the QCP 318 to begin Grover's conversions for the requested data elements 334.

FIG. 5 shows that the boundary synthesizer 322 next sends the synthesized quantum boundary rules to a Grover's diffusion operator 320. The Grover's diffusion operator 320 transforms the quantum boundary rules into parallel quantum boundary rules, represented by Pn, Px, and $P_{ML}$. Pn represents an n number of requested data elements from a static source. Px represents an x number of requested data elements from other data sources (e.g., dynamic sources). $P_{ML}$ represents requested data elements processed by an MLM.

Figure 6:
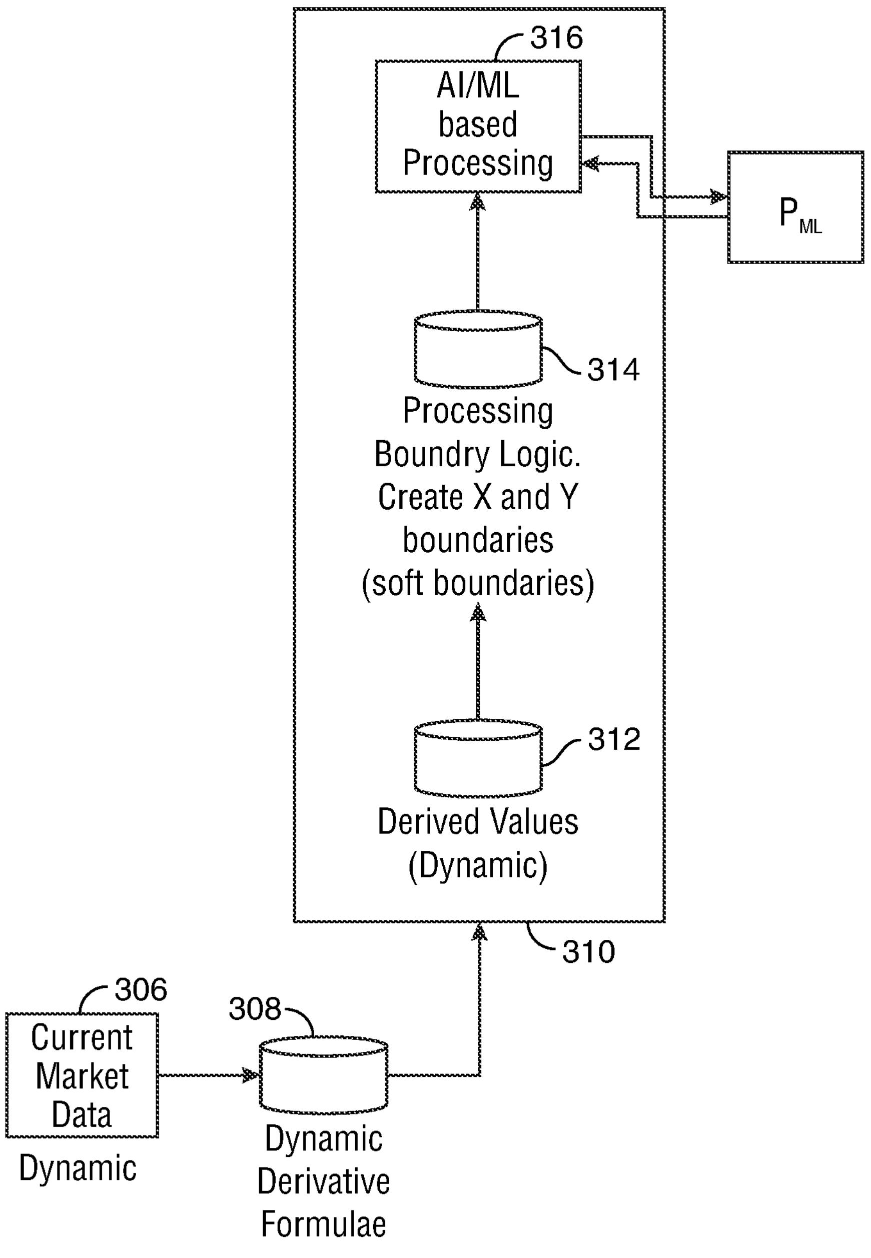
FIG. 6 shows further an illustrative diagram in accordance with principles of the disclosure.

FIG. 6 shows an illustrative diagram in accordance with principles of the disclosure. The parallel quantum threads, Pn, Px, and $P_{ML}$, from FIG. 5 may flow bidirectionally. All arrows and flows of the disclosure are bidirectional, i.e., flowing in both backward and forward directions.

FIG. 6 shows the parallel quantum boundary rules from FIG. 5 may also flow directly into one or more other data sources and dynamic current market data 306. Dynamic current market data 306, including, for example, up-to-date market data, may be provided to the system. On its way back to the user, current market data may be passed through dynamic derivative formulae 308. Then the current market data passed through the dynamic derivative formulae 308 may be passed through legacy transformation platform 310. Legacy transformation platform 310 may feed data reporting software back through QCP 318.

FIG. 6 shows that legacy transformation platform 310 may include, for example, dynamically derived data values 312, processing boundary logic 314, and an AI and ML processor 316. The processing boundary logic 314 may create soft boundaries, e.g., X and Y boundaries that enable AI systems to access and manipulate data with restrictions. The dynamically derived data values 312, via dynamic current market data 306 passed through the dynamic derivative formulae 308, and through the legacy transformation platform 310, are then routed back through the QCP 318, and back to the user 332. The three components of the methods and systems provided in FIG. 3, represented by FIGS. 4-6, may flow back and forth into one another. In this sense, the systems and methods provided are bidirectional in nature.

Figure 7A:
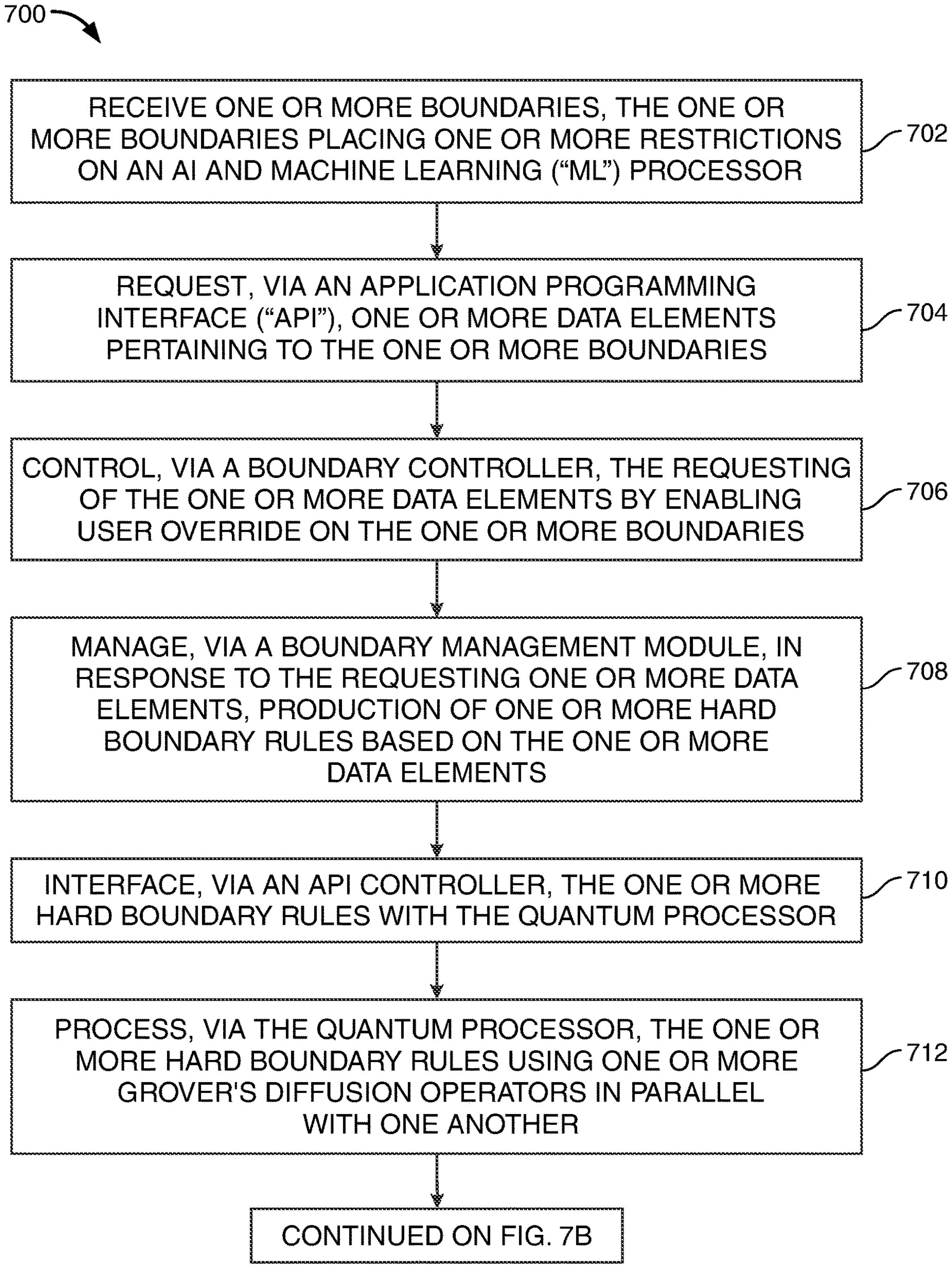
FIG. 7A shows an illustrative flow chart diagram in accordance with principles of the disclosure.

FIG. 7A shows an illustrative flow chart diagram 700 in accordance with principles of the disclosure.

The illustrative flow chart diagram 700 shows an exemplary method or system in accordance with principles of the disclosure. The illustrative flow chart diagram 700 shows a method or system that may begin to receive one or more boundaries 702. The one or more boundaries may place one or more restrictions on an AI and ML processor.

Next, the method and system may include the following step: receive a request 704, via an API, for one or more data elements. The one or more data elements may pertain to the one or more boundaries.

The next step of the flow chart may be to control 706, in response to a boundary controller requesting the one or more data elements. The requesting of the one or more data elements may be controlled by enabling user override on the one or more boundaries.

The next step of the flow chart may be to manage 708, via a boundary management module, in response to the requesting one or more data elements, production of one or more hard boundary rules based on the one or more data elements. The one or more hard boundary rules may disable the AI and ML processor.

The next step of the flow chart may be to interface 710, via an API controller, one or more hard boundary rules with the quantum processor. The quantum processor may be located within a QCP.

The next step of the flow chart may be to process 712, via the quantum processor, the one or more hard boundary rules from a classical algorithm to a quantum algorithm. The processing may use one or more Grover's diffusion operators in parallel.

Figure 7B:
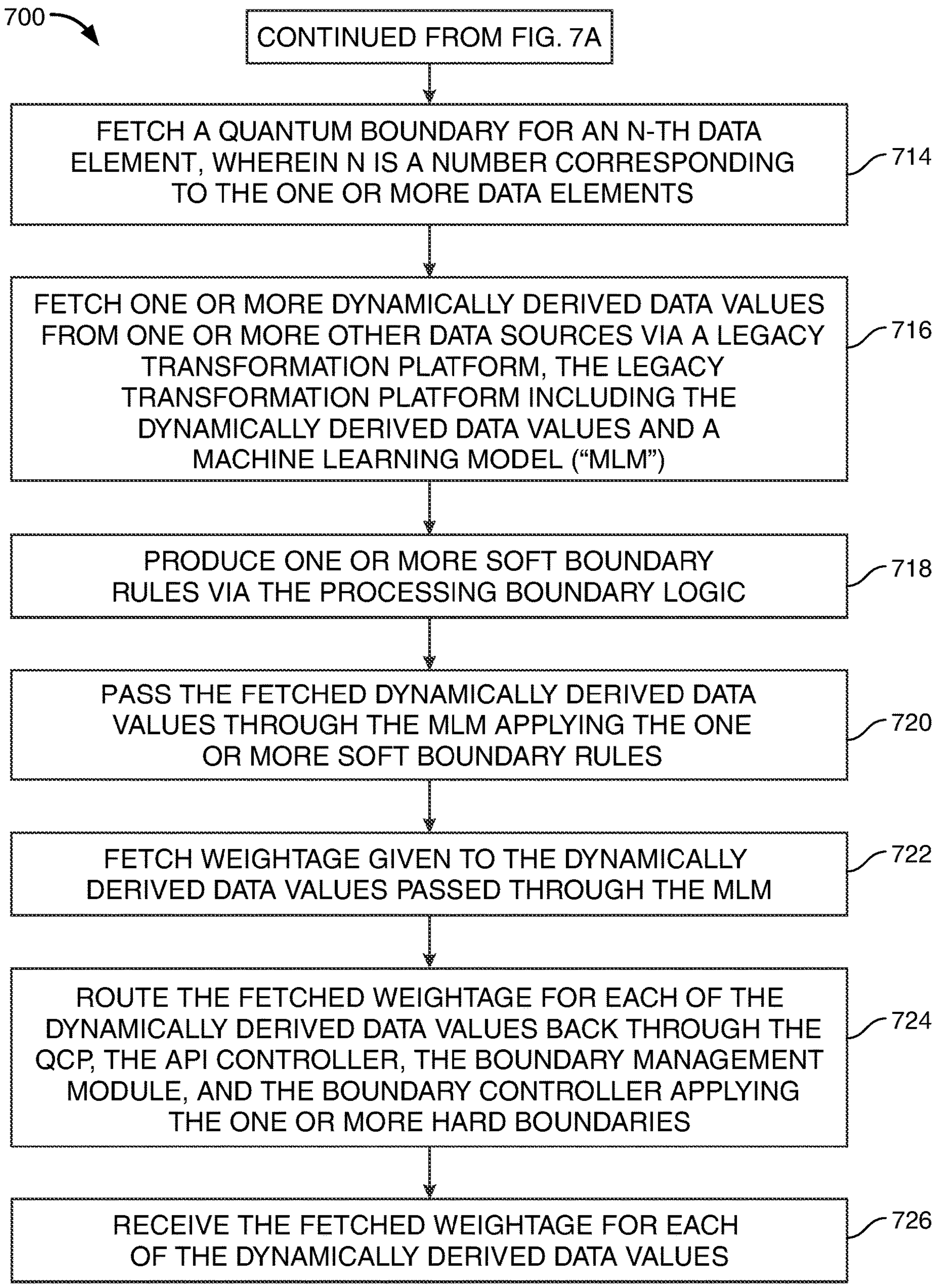
FIG. 7B shows a continuation of the illustrative flow chart diagram of FIG. 7A in accordance with principles of the disclosure.

FIG. 7B shows a continuation of the illustrative flow chart diagram 700 of FIG. 7A in accordance with principles of the disclosure.

The next step of the flow chart may fetch a quantum boundary for an n-th data element 714. "n" may be a number corresponding to the one or more data elements.

The next step of the flow chart may fetch one or more dynamically derived data values from one or more other data sources via a legacy transformation platform 716. The legacy transformation platform may include dynamically derived data values and an MLM. The MLM may include a processing boundary logic, and an AI and ML processor.

The next step of the flow chart may be to produce one or more soft boundary rules via the processing boundary logic 718. The one or more soft boundary rules may enforce one or more restrictions on the AI and ML processor.

The next step of the flow chart may pass the fetched dynamically derived data values through the MLM 720, applying the one or more soft boundary rules.

The next step of the flow chart may fetch weightage given to the dynamically derived data values passed through the MLM 722.

The next step 724 of the flow chart may apply on or more boundaries. This may be implemented by routing the fetched weightage for each of the dynamically derived data values back through the QCP, the API controller, the boundary management module, and the boundary controller.

And the final step of the flow chart may receive the fetched weightage for each of the dynamically derived data values 726.

The steps of methods and systems may be performed in orders beyond the order shown and/or described herein. Embodiments may omit steps shown and/or described in connection with illustrative methods. Embodiments may include steps that are neither shown nor described in connection with illustrative methods.

Illustrative methods and systems steps may be combined. For example, an illustrative method may include steps shown in connection with another illustrative method.

Methods and systems may omit features shown and/or described in connection with illustrative methods and systems. Embodiments may include features that are neither shown nor described in connection with the illustrative methods and systems. Features of illustrative methods and systems may be combined. For example, an illustrative embodiment may include features shown in connection with another illustrative embodiment.

The drawings show illustrative features of methods and systems in accordance with the principles of the disclosure. The features are illustrated in the context of selected embodiments. It will be understood that features shown in connection with one of the embodiments may be practiced in accordance with the principles of the disclosure along with features shown in connection with another of the embodiments.

One of ordinary skill in the art will appreciate that the steps shown and described herein may be performed in other ways and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and systems for quantum computing and AI bidirectional monitoring with quantum computing as a flexible guardrail to AI are provided. Persons skilled in the art will appreciate that the present disclosure can be practiced in other ways. The described embodiments are presented for purposes of illustration—not limitation—and the present disclosure is limited only by the claims that follow.

What is claimed is:

1. A method for artificial intelligence ("AI") monitoring and control using a quantum-computing-powered system comprising a quantum processor, the method comprising:

receiving one or more boundaries, the one or more boundaries placing one or more restrictions on an AI and machine learning ("ML") processor;

requesting, via an application programming interface ("API"), one or more data elements pertaining to the one or more boundaries;

controlling, via a boundary controller, the requesting of the one or more data elements by enabling user override on the one or more boundaries;

in response to the one or more requested data elements, managing, via a boundary management module, production of one or more hard boundary rules, the one or more hard boundary rules disabling the AI and ML processor;

interfacing, via an API controller, the one or more hard boundary rules with the quantum processor, said quantum processor being located within a quantum computing platform ("QCP");

processing, via the quantum processor, the one or more hard boundary rules from a classical algorithm to a quantum algorithm, the processing using one or more Grover's diffusion operators in parallel;

fetching a quantum boundary for an n-th data element, wherein n is a number corresponding to the one or more data elements;

fetching one or more dynamically derived data values from one or more other data sources via a legacy transformation platform, said legacy transformation platform comprising the dynamically derived data values, a machine learning model ("MLM") comprising a processing boundary logic, and the AI and ML processor;

producing one or more soft boundary rules via the processing boundary logic, the one or more soft boundary rules enabling the AI and ML processor with the one or more restrictions;

passing the fetched dynamically derived data values through the MLM applying the one or more soft boundary rules;

fetching weightage given to the dynamically derived data values passed through the MLM the weightage including one or more of logics formulae, decision paths, or the MLM elements and attributes relating to the dynamically derived data values;

routing the fetched weightage for each of the dynamically derived data values back through the QCP, the API controller, the boundary management module, and the boundary controller applying the one or more hard boundaries; and receiving the fetched weightage for each of the dynamically derived data values.

2. The method of claim 1 further comprising:

storing the fetched weightage in a database; and using the fetched weightage to make decisions based on both the receiving the one or more boundaries and danger points associated with the AI and ML processor, the danger points identifying any instances where the AI and ML processor attempted to bypass the one or more boundaries.

3. The method of claim 2 further comprising:

logging, in a cloud-based control file, the fetched weightage stored in the database; and using the cloud-based control file as part of making decisions based on the receiving the one or more boundaries.

4. The method of claim 1 further comprising:

determining whether the fetched weightage is authentic; and only routing the fetched weightage to a user when it is determined that the fetched weightage is authentic, an authentic weightage bypassing the one or more restrictions.

5. The method of claim 1 wherein the processing, via the quantum processor, of the one or more boundary rules with the quantum processor comprises processing via a qubit-based algorithm.

6. The method of claim 1 wherein the AI and ML processor determines the fetched weightage at least in part using dynamic market data and historical market frequency patterns and the one or more other data sources comprises current market data analyzed via dynamic derivative formulae.

7. The method of claim 1 wherein if the AI and ML processor attempts to bypass the one or more hard boundaries, the AI and ML processor is automatically disabled.

8. A quantum-computing-powered system with artificial intelligence ("AI") computing for AI monitoring and control, the quantum-computing-powered system comprising:

a quantum processor;

wherein a user of the quantum-computing-powered system:

receives one or more boundaries, the one or more boundaries placing one or more restrictions on an AI and machine learning ("ML") processor;

requests, via an application programming interface ("API"), one or more data elements pertaining to the one or more boundaries;

controls, via a boundary controller, the requesting one or more data elements by enabling user override on the one or more boundaries;

manages, via a boundary management module, a production of one or more hard boundary rules, the one or more hard boundary rules disabling the AI and ML processor, in response to the one or more requested data elements;

interfaces, via an API controller, the one or more hard boundary rules with the quantum processor, said quantum processor being located within a quantum computing platform ("QCP");

processes, via the quantum processor, the one or more hard boundary rules from a classical algorithm to a quantum algorithm, said processing uses one or more Grover's diffusion operators in parallel;

fetches a quantum result for an n-th data element, wherein n is a number corresponding to the one or more data elements;

fetches one or more dynamically derived data values from one or more other data sources via a legacy transformation platform, said legacy transformation platform comprising the dynamically derived data values, a machine learning model ("MLM") comprising a processing boundary logic, and the AI and ML processor;

produces one or more soft boundary rules via the processing boundary logic, the one or more soft boundary rules enabling the AI and ML processor with the one or more restrictions;

passes the fetched dynamically derived data values through the MLM applying the one or more soft boundary rules;

fetches weightage given to the dynamically derived data values passed through the MLM the weightage including one or more of logics formulae, decision paths, or the MLM elements and attributes relating to the dynamically derived data values;

routes the fetched weightage for each of the dynamically derived data values back through the QCP, the API controller, the boundary management module, and the boundary controller applying the one or more hard boundary rules; and receives the fetched weightage for each of the dynamically derived data values.

9. The quantum-computing-powered system of claim 8 further configured to:

store the fetched weightage in a database; and use the fetched weightage to make decisions based on both the receiving the one or more boundaries and danger points associated with the AI and ML processor, the danger points identifying any instances where the AI and ML processor attempted to bypass the one or more boundaries.

10. The quantum-computing-powered system of claim 9 further configured to:

log, in a cloud-based control file, the fetched weightage stored in the database; and use the cloud-based control file as part of making decisions based on the receiving the one or more boundaries.

11. The quantum-computing-powered system of claim 8 further configured to:

determine whether the fetched weightage is authentic; and only route the fetched weightage to a user when it is determined that the fetched weightage is authentic, an authentic weightage bypassing the one or more restrictions.

12. The quantum-computing-powered system of claim 8 wherein the processing, via the quantum processor, of the one or more hard boundary rules comprises processing via a qubit-based algorithm.

13. The quantum-computing-powered system of claim 8 wherein the AI and ML processor determines the fetched weightage at least in part using dynamic market data and historical market frequency patterns, and the one or more other data sources comprises current market data analyzed via dynamic derivative formulae.

14. The quantum-computing-powered system of claim 8 wherein if the AI and ML processor attempts to bypass the one or more hard boundaries, the AI and ML processor is automatically disabled.

* * * * *